United States Patent Office 3,132,803
Patented May 12, 1964

3,132,803
THERMOSTATIC BURNER FUEL CONTROL SYSTEMS
Clarence Wantz, Charles D. Branson, and James R. Willson, Greensburg, Pa., assignors to Robertshaw Controls Company, a corporation of Delaware
Filed Aug. 14, 1959, Ser. No. 833,742
17 Claims. (Cl. 236—68)

This invention relates to systems for controlling the flow of fuel to burners and more particularly to systems especially adapted to automatically control a flow of fuel to a domestic gas oven burner to maintain a preselected temperature within the oven.

One of the customary methods for controlling the flow of fuel to a burner is by utilizing a control valve which thermostatically throttles the flow of fuel in accordance with the temperature of the space being heated. In domestic gas ovens, such control valves are normally provided with a bypass so that when the main thermostatic valve is closed, gas flows to the oven burner through the bypass at the minimum rate necessary for ignition of the gas as it flows from the burner The insulated enclosures of domestic ovens make it difficult to control temperatures below 300° F. since when the thermostatic valve is closed, the minimum bypass flames produce temperatures within this range. Accordingly, it is an object of this invention to control the flow of fuel to maintain a "warming" oven at a temperature in the order of 140° F. or higher, in addition to providing suitable control for normal oven temperatures.

Another object of this invention is to control the flow of fuel so that a single oven burner can be utilized to provide a "warming" oven.

Another object of this invention is to control flow to a main burner independently by thermostatically controlling flow to a controller pilot in response to the temperature of the space being heated by the main burner.

A still further object of this invention is to incorporate safety control features into the system, in addition to the temperature control features.

Other objects and advantages of this invention will be apparent from the following description taken in connection with the accompanying drawings wherein:

FIG. 1a is a detail view of an element shown in FIG. 1;

Figure 1:
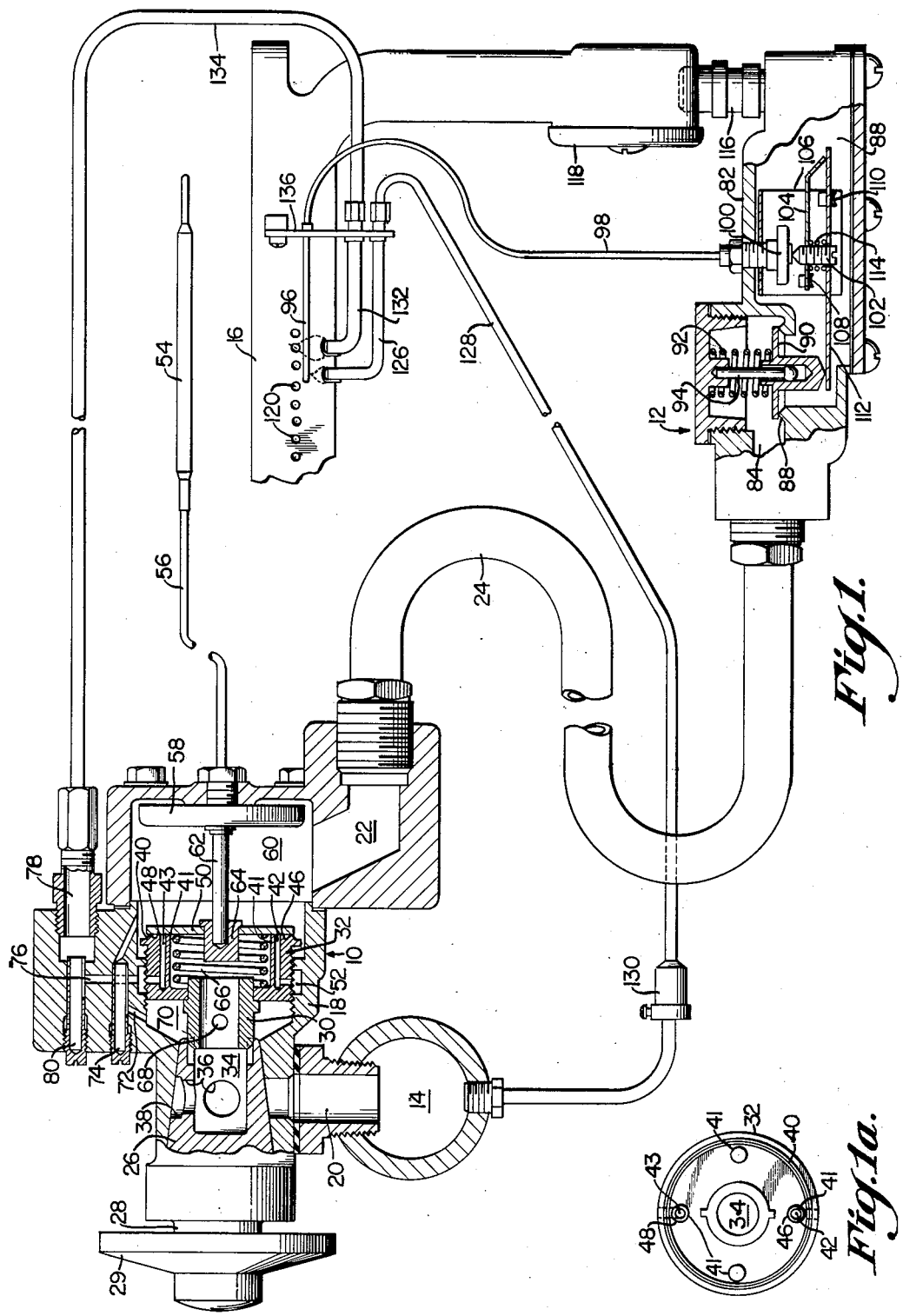
FIG. 1 is a somewhat schematic arrangement, with portions broken away and with other portions in a longitudinal section, of the preferred embodiment of this invention.

Referring now to the drawings and more particularly to FIG. 1, a valve 10 is connected to a valve 12 for controlling the flow of fuel from a gas supply manifold 14 to an oven burner 16. Valve 10 is preferably of the combined thermostatic valve and gas cock type. As shown, it is a modification of a valve of a type disclosed in U.S. Patent No. 2,303,011 to which reference may be made for a more complete description of the construction and mode of operation.

Valve 10 comprises a composite casing 18 formed with an inlet 20 and an outlet 22 connected respectively to manifold 14 and one end of a conduit 24 connected at its other end to valve 12. A gas cock in the form of a hollowed, tapered valve plug 26 is connected to a manually operated shaft 28, the outer end of which is connected to a control knob 29 preferably provided with suitable indicia corresponding to the temperature to be maintained in the oven. The inner end of plug 26 is slotted to receive the cooperating portion of a connector 30 which transmits rotation of valve plug 26 to a valve seat member 32. A flow passage 34 extends through a portion of plug 26 and through connector 30 and valve seat member 32. Communication between inlet 20 and passage 34 is afforded through ports 36 and an arcuate groove 38 formed in plug 26 about a portion of the tapered periphery thereof.

Valve seat member 32 is exteriorly threaded and is screwed into an interiorly threaded portion of casing 18. Rotation of plug 26 and shaft 28 cause connector 30 and valve seat member 32 to rotate and move axially within casing 18.

Valve seat member 32 is provided with a substantially cup-shaped body formed at its open end with an outer annular valve seat 40. As best seen in FIG. 1a, four lugs 41 are cast integral with the body and are spaced 90° apart. Two of the lugs are drilled to provide a pair of flow passages 42 and 43 and a pair of inner valve seats 46 and 48 at the exposed ends of the two drilled lugs. Valve seats 46 and 48 lie in the same plane as valve seat 40 and are simultaneously engageable with a disc valve 50. Passages 42 and 43 cooperate with a pair of radially extending passages that communicate with an annular groove 52 formed in the interiorly threaded portion of casing 18. It will be obvious that the number of inner valve seats is purely a matter of choice, although it is preferable to have two of them.

Temperature responsive means are provided for actuating valve 50 to thermostatically throttle the flow of gas and comprise a pressure thermometer in the form of a temperature sensing bulb 54 connected by a capillary tube 56 to an expansible power element 58. These elements form a closed system which is filled with a temperature sensitive fluid that causes expansion and contraction of power element 58 in response to changes in the temperature of the oven as sensed by bulb 54. Power element 58 is disposed in a chamber 60 formed in casing 18 downstream from valve seat member 32. A valve stem 62 is connected to the movable end wall of element 58 and is provided with overrun means (not shown) and a hub 64 on which valve 50 is mounted. A helical compression spring 66 biases member 50 away from valve seat 32.

Connector 30 is provided with passage means 68 through which an annular chamber 70, formed upstream of valve seat member 32, communicates with passage 34. A bypass passage 72 extends between chambers 70 and 60 and is provided with an adjusting screw 74 for adjusting the flow rate. Another passage 76 extends from groove 52 to an outlet 78 and is provided with an adjusting screw 80.

Valve 12 comprises a casing 82 formed with an inlet 84 connected to conduit 24, and an outlet which communicates with a central flow passage 86. Casing 82 is also formed with an annular valve seat 88 which is cooperable with a valve member 90 for controlling the flow of gas through valve 12. Valve member 90 is biased by a helical compression spring 92 towards engagement with valve seat 88. Movement of valve member 90 is restricted to a plane perpendicular to the plane of valve seat 88 by a guide pin 94.

Temperature or flame responsive means are provided for moving valve member 90 from a closed position to an open position and comprise a temperature sensitive bulb 96 connected by a capillary tube 98 to an expansible power element 100 disposed within passage 86. The movable end wall of power element 100 abuts an adjusting screw 102 carried by a lever 104. A stationary bracket 106 is mounted between the casing 82 and power element 100 and is formed with a pair of pivots 108 and 110 about which lever 104 and a lever 112 respectively pivot. Screw 102 passes through an aperture suitably formed in lever 112. A helical compression spring 114 extends between levers 104 and 112 to maintain the levers against their respective pivots and against power element 100 and valve member 90. Adjusting screw 102 allows the temperature at which valve member 90 opens and closes to be varied, the lift of valve member 90 to be varied, and compensates for varying dimensions due to manufacturing tolerances of the parts.

An adjustable orifice hood 116 is connected to valve 12. Orifice hood 116 is formed with an orifice 117 (FIG. 3) which serves to increase the velocity of gas so that a quantity of primary air is entrained through an adjustable air shutter 118 prior to the resultant combustible mixture flowing from a plurality of burner ports 120. A continuously burning standby pilot 126 is connected by a conduit 128 to manifold 14. Conduit 128 includes a device 130 comprising a filter and a gas cock for adjusting the flow to pilot 126. A controller pilot 132 is connected by a conduit 134 to outlet 78. Pilots 126 and 132 and bulb 96 are mounted upon a stationary bracket 136. Standby pilot 126 and controller pilot 132 are arranged adjacent to burner 16 so that a flame at pilot 126 ignites gas flowing from pilot 132 which in turn ignites gas flowing from burner 16. Alternatively, pilot 126 may be arranged to directly ignite burner 16; however, the former arrangement is preferable since it allows the size of the continuously burning pilot flame to be smaller. This causes a cooler oven during periods when it is not being used.

Valve 12 acts as an automatic valve to prevent the flow of gas to burner 16 in the event there is no flame burning at either of pilots 126 or 132. Valve 12 might be considered automatic in the sense that it is not necessary to manually reset it to the open position. The flame from pilot 132 is directed upon bulb 96 to vaporize a portion of the mercury contained therein. Initially, the vaporization of the mercury expels liquid mercury from bulb 96 causing expansible element 100 to expand and rotate levers 104 and 112 in a clockwise direction causing valve member 90 to raise from valve seat 88 to allow gas to flow through valve 12. Subsequent cooling of bulb 96 causes vapor contained therein to condense so that the expansible element 100 collapses allowing spring 92 to move valve member 90 into engagement with valve seat 88 to shut off the flow through valve 12.

It will be obvious that valve 12 is either open or closed. The normal temperatures encountered in an oven are relatively high, but since the boiling point temperature of the mercury is even higher, the ambient temperature of the oven does not affect the opening and closing of valve 12. The movement of valve member 90 in response to vaporization and condensation of mercury within bulb 96 is fairly rapid. Furthermore, the closing action is aided by the pressure at inlet 84 so that as valve member 90 approaches valve seat 88, the pressure drop thereacross creates a force which further speeds the closing action.

As shown in FIG. 1, the system is not operating. To initiate operation, control knob 29 is rotated to position valve seat member 32 with respect to valve 50 to set the temperature to be maintained within the oven by burner 16. This rotation allows gas to flow from manifold 14 through inlet 20, groove 38, port 36, passage 34, and through valve seat member 32 to chamber 60. Since valve 12 is closed, the only gas flowing from valve 10 flows from chamber 70 through valve seats 46 and 48 to groove 52 from where the gas flows by passage 76 to conduit 134 and controller pilot 132. The gas is ignited by standby pilot 126, causing bulb 96 to be heated, whereupon valve 12 opens to allow gas to flow from chamber 60 through outlet 22, conduit 24, and valve 12 to burner 16 where it is ignited. As the temperature of the oven increases, the temperature of sensing bulb 54 increases causing power element 58 to move valve member 50 towards valve seats 40, 46, and 48 and thermostatically throttle the flow to burner 16 and pilot 132.

Adjusting screw 74 is preferably adjusted to provide the minimum flow for sustaining a flame at burner 16 when valve member 50 engages valve seat 40. When control knob 29 is set to a "warming" temperature, that is, a temperature below that produced by a continuously burning bypass flame, the movement of valve member 50, in response to increases in temperature of bulb 54, continues until it engages valve seats 40, 46, and 48. When this happens, the flow to controller pilot 132 is shut off whereupon valve 12 closes.

Subsequent decreases in temperature cause valve member 50 to open allowing gas to flow to pilot 132 where it is ignited causing valve 12 to open and admit gas to burner 16. This action of opening and closing of valve member 50 and valve 12 maintains the desired control temperature. Since valve member 50 must be open in order for valve 12 to open, burner 16 will always light on a flame that is larger than the bypass flame.

At temperature settings above the temperature produced by continuously burning bypass flame, the heat loss from the oven requires a greater heat input. Consequently, the flow to burner 16 is greater and valve member 50 remains open all the time, until the temperature setting is later changed.

*Second Embodiment*

Figure 2:
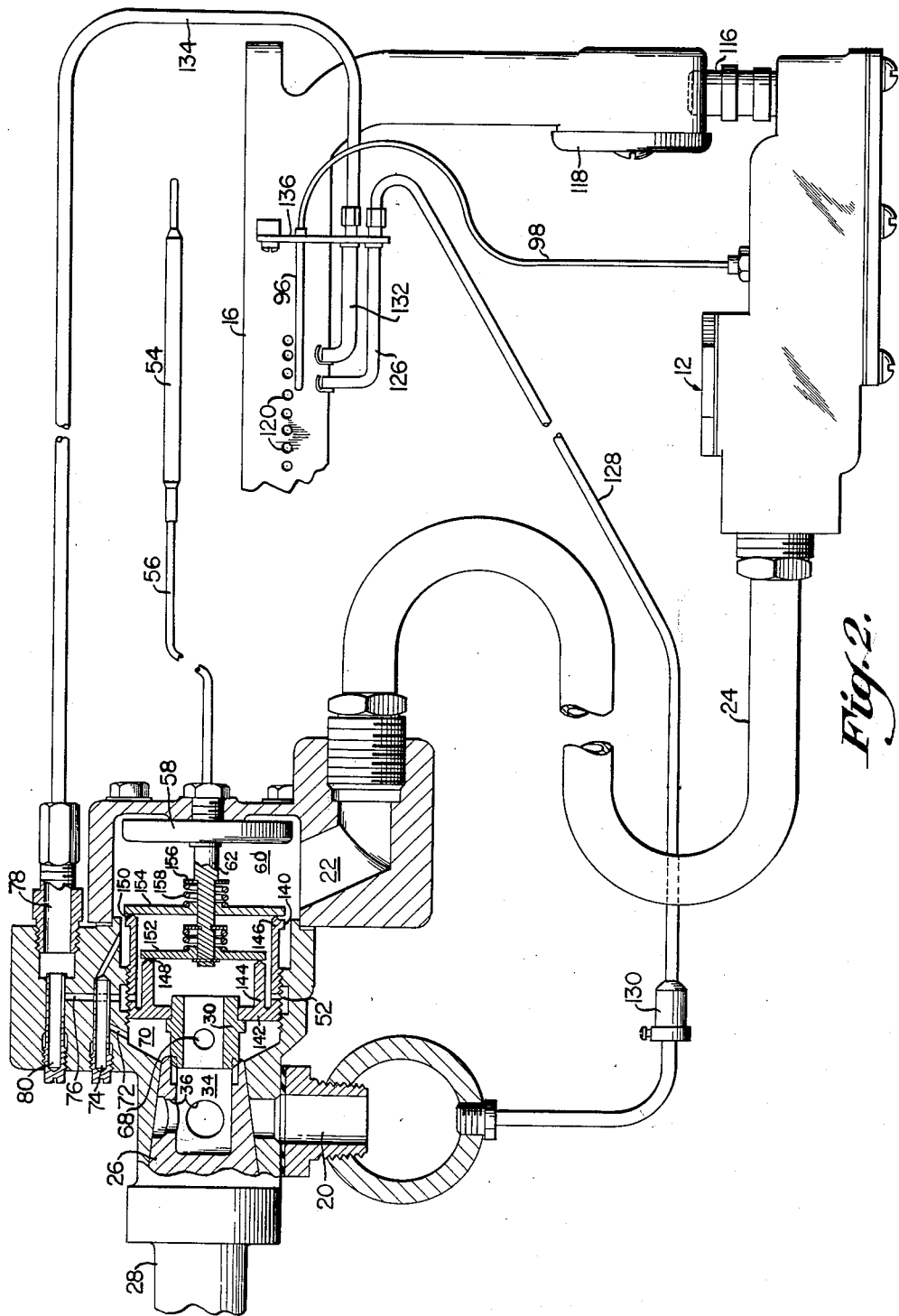
FIG. 2 is a view similar to FIG. 1 showing another embodiment of this invention.

The structure of the embodiment shown in FIG. 2 is identical to that shown in FIG. 1, except for the construction of the thermostatic valve. In the embodiment of FIG. 2, a valve seat member 140 is formed with an annular base 142 connected to connector 30. A pair of tubular members 144 and 146 extend from the base 142 and are formed with different diameters and lengths to provide a pair of axially spaced valve seats 148 and 150 at their outer ends. Valve seat member 140 is exteriorly threaded and is screwed into an interiorly threaded portion of casing 18. Tubular member 146 is provided with a plurality of ports through which passage 34 communicates with groove 52.

A pair of disc valve members 152 and 154 are carried on valve stem 62 and cooperate respectively with valve seats 148 and 150 for respectively controlling flow to controller pilot 132 and burner 16. A plurality of spaced annular washers 156 and helical compression springs 158 are so arranged on valve stem 62 that valve member 154 opens and closes at a lower temperature than that at which valve member 152 opens and closes.

The operation of the embodiment shown in FIG. 2 is as follows: Rotation of control knob 28 positions valve seat member 140 proportional to the temperature to be maintained within the oven. This rotation causes valve members 152 and 154 to separate from valve seat member 140 and gas flows to controller pilot 132 where it is ignited causing valve 12 to open and admit gas to burner 16. As the temperature of bulb 54 increases, valve members 152 and 154 move towards their respective valve seats. At low temperature settings, valve member 154 moves into engagement with valve seat 150 at the set temperature to shut off the flow through valve seat member 140 to burner 16; however, gas flows through bypass passage 72 to burner 16. If the temperature of bulb 54 continues to increase, valve stem 62 moves with respect to valve member 154 against the bias of one of the springs 158 and valve member 152 moves into engagement with valve seat 148 to shut off the flow to controller pilot 132, thereupon causing valve 12 to close.

Subsequent decreases in temperature cause valve member 152 to open before valve member 154 so that controller pilot 132 is open to allow gas to flow through bypass passage 72 when valve 12 opens in response to pilot 132.

At higher temperature settings, the valve members 152 and 154 merely throttle flow to both controller pilot 132 and burner 16. At temperatures intermediate to the above described temperatures, when valve member 154 engages valve seat 150, the temperature does not overshoot sufficiently to cause valve member 152 to shut off the flow to controller pilot 132 so that the temperature is maintained at that produced by a continuously burning bypass flame.

Third Embodiment

Figure 3:
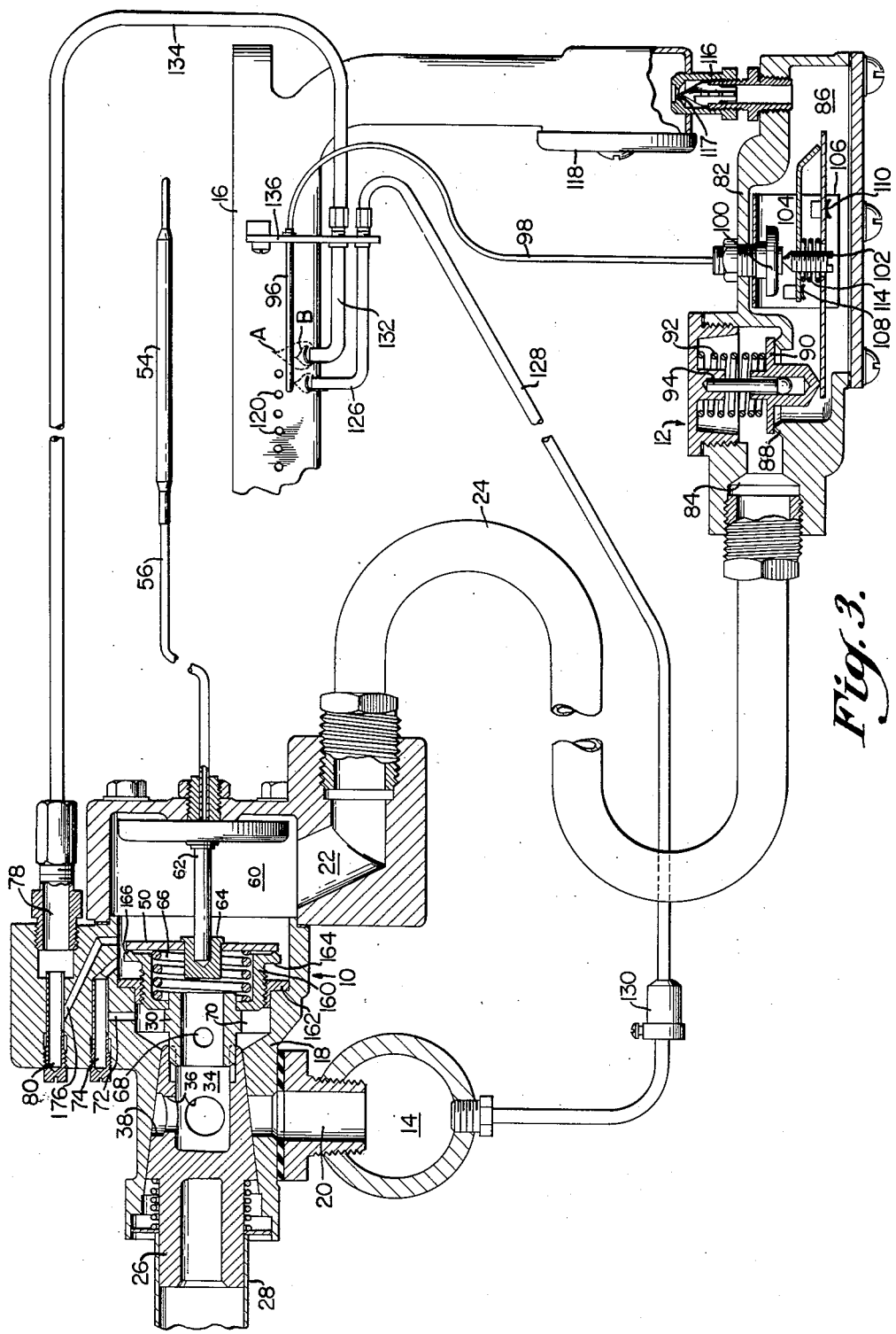
FIG. 3 is another view similar to FIG. 1 showing still another embodiment of this invention.

The structure of the embodiment shown in FIG. 3 is similar to that shown in FIG. 1, except for the construction of the valve seat member and the location of the passage 76.

In this embodiment, a valve seat member 160 is exteriorly threaded and is screwed into an interiorly threaded bushing 162 press-fitted into casing 18. Valve seat member 160 is connected to connector 30 and is provided with an annular flange 164 in which an annular valve seat 166 is formed. Valve seat 166 cooperates with valve member 50 for controlling the flow. A passage 176 extends from chamber 60 to outlet 78.

The position of controller pilot 132 is so arranged that not all flames burning thereat are sufficient to vaporize the mercury within bulb 96. At a full flame, indicated at "A" in the drawing, valve 12 is open. Valve 12 remains open during subsequent decreases in the flame height until the flame reaches an intermediate height or position "B" below which, valve 12 is closed.

Assuming the system is in the position shown in FIG. 3 wherein valve 10 and valve 12 are closed and a flame is burning at standby pilot 126, the operation is begun by rotating shaft 28 to the set point corresponding to the desired temperature to be maintained in the oven. The rotation of shaft 28 moves plug 26 and valve seat 166. Gas then flows from supply manifold 14 through inlet 20, passage 34, chamber 60, and to outlet 78 through passage 176. Since valve 12 is closed, none of the gas flows from outlet 22; however, gas flows from chamber 60 through passage 176 to controller pilot 132 where the gas is ignited by the flame of the standby pilot 126. The pressure within chamber 60 is relatively high so that the flame at controller pilot 132 is in a high position (position A). This heats bulb 96 causing valve 12 to open whereupon gas flows from outlet 22 to burner 16 and is ignited.

As the temperature of bulb 54 increases in response to increases in oven temperature, valve member 50 is moved towards valve seat 166 to thermostatically throttle and decrease the flow of gas to burner 16. Orifice hood 116 and adjusting screw 80 are so positioned that at full flow rates, the back pressure generated by orifice 117 is sufficient to maintain a relatively full flow to controller pilot 132. But, as the temperature of bulb 54 increases and the flow decreases, the back pressure gradually decreases so that the rate of fuel flowing to controller pilot 132 is reduced. Consequently, the flame size reduces until, if the set point is low, the flame is insufficient to maintain the mercury vaporized within bulb 96 and valve 12 thereupon closes. This shutoff occurs when valve member 50 is in close proximity to valve seat 166.

When valve 12 closes, the pressure increases within chamber 60 causing an increase in the rate of flow of fuel to controller pilot 132. This causes the flame size at controller pilot 132 to increase with a resultant vaporization of the mercury within bulb 96 and opening of valve 12. When valve 12 opens, gas flows to burner 16 and is ignited; however, the back pressure decreases in chamber 60 so that the flame at controller pilot 132 reduces until valve 12 subsequently closes.

This action continues and results in a cycling of the flow to burner 16. The period of each cycle is dependent upon the thermal properties of bulb 96 which can be varied to accommodate the particular installation involved. Adjusting screw 74 is adjusted so that when valve member 50 engages valves seat 166, gas flows to burner 16 at the safe minimum rate which can be ignited.

Adjusting screw 80 is adjusted to provide the proper pressure balance of the system to cause the cycling to take place in the manner described.

At the minimum temperature setting which can be controlled, valve member 50 is in engagement with valve seat 166 and the cycling of the flow rate is between "off" and the rate of flow through bypass 72, which, as previously mentioned, is the minimum flow which can be safely ignited. This produces an average heat input which is below that obtained by a continuously burning bypass flame.

At slightly higher temperature settings, valve member 50 is slightly open to provide for a higher flow rate to burner 16 so that the average heat input will be slightly higher to maintain the desired control temperature.

At still higher temperature settings, the heat loss from the oven is sufficiently great so that valve member 50 does not move close enough to valve seat 166 to cause valve 12 to close. Thus, this system provides "on-off control" only at the low temperature settings. At higher temperature settings, straight line or modulated control is afforded. This automatic transition from straight line control to "on-off control" results from the fact that both the main burner gas flow and the controller pilot gas flow are controlled by the same thermostatic valve.

It will also be obvious that the cycle of this system is self-sustaining and does not rely on controlled temperature variations. That is, it operates with virtually no temperature differential.

An alternate mode of operation is achieved by closing adjusting screw 74 to prevent flow of fuel through bypass 72. In this case, adjusting screw 80 would be positioned to maintain a flame on burner 16 until valve 12 closes and to prevent the valve 12 from opening until the thermostatic valve has opened sufficiently to permit a flame at burner 16. At low temperature settings, the flow of fuel would be throttled to both pilot 132 and burner 16 until bulb 54 reaches the control temperature whereupon valve 12 closes. Valve 12 will subsequently be cycled between open and closed positions to maintain the desired temperature. At higher temperature settings, the flow is merely throttled and valve 12 does not close.

Many changes and modifications may be made in the details and arrangement of parts of this invention without departing from the scope of the invention as defined in the appended claims.

We claim:

1. In a fuel control system, the combination comprising: a main burner, a controller pilot disposed adjacent said main burner, means for thermostatically controlling the flow of fuel to said main burner and to said controller pilot, orifice means connected to said burner for injecting fuel therein, valve means having sensing means disposed away from said main burner and adjacent said controller pilot and being operably connected for controlling flow to said main burner in accordance with only the existence of a flame at said controller pilot, means bypassing said first mentioned means and cycling the flow to said controller pilot in response to changes in backpressure caused by said orifice means to cycle flow to said main burner between "off" and a minimum flow that can be ignited, and second means by-passing said thermostatic means to supply a by-pass flow of fuel to said main burner when said valve means is in an on position whereby said second by-pass means supplies a sufficient quantity of fuel to said main burner to support combustion at said main burner so that no unignited fuel passes out of said main burner during the time when said thermostatic means is closed and said valve means is remaining open because of thermal lag in closing of said valve means.

2. In a heating system having a main burner and a controller pilot, the combination comprising: thermostatic valve means for controlling flow to the main burner in accordance with the temperature of the space being heated, flame actuated valve means having sensing means disposed away from said main burner and adjacent said controller pilot and being movable between open and closed positions for controlling the flow to the main burner, a controller pilot disposed adjacent the main burner for controlling said flame actuated valve means, means varying the height of the flame at the controller pilot and moving said flame actuated valve means between open and closed positions to cycle the flow rate to the main burner to produce an average heat input less than that obtained from a continuously burning flame having the minimum flow rate for sustaining the flame, and means by-passing said thermostatic valve means to supply a bypass flow of fuel to said main burner when said flame actuated valve means is in an on position whereby said by-pass means supplies a sufficient quantity of fuel to said main burner to support combustion at said main burner so that no unignited fuel passes out of said main burner during the time said thermostatic valve means is closed and said flame actuated valve means is remaining open because of thermal lag in closing of said flame actuated valve means.

3. A system for controlling the flow of gas to a domestic oven provided with a single burner for heating the oven, comprising: first valve means movable between an open and a closed position for respectively permitting and blocking the flow of gas to the burner; pilot means; means responsive to the size of a flame burning at said pilot means for actuating said first valve means; second valve means movable between positions and controlling the flow of gas to said first valve means and to said pilot means; means responsive to the temperature of the oven and being operatively connected to move said second valve means to maintain a predetermined temperature within the oven; and by-pass means around said second valve means for supplying a flow of gas to said pilot means and said first valve means when said second valve means is closed whereby said by-pass means supplies a sufficient quantity of fuel to said burner to support combustion at said burner so that no unignited gas passes out of said burner during the time said second valve means is closed and said first valve means is remaining open because of thermal lag in closing of said first valve means.

4. The system of claim 3 in which said second valve means is adjustable for varying the predetermined temperature.

5. The system of claim 4 including an orifice hood adapted to be connected to the burner and being formed with an orifice for injecting gas into the burner, said orifice being operable at high flow rates to the burner to generate sufficient back pressure to maintain a high flame at said pilot means to hold said first valve means in an open position, and said orifice being ineffective at low flow rates to maintain a high flame at said pilot means when said first valve means is open so that at low temperature settings, said first valve means opens and closes to cycle the flow of gas to the burner to produce an average heat input less than that obtained by a continuously burning bypass flame.

6. A control system for a fuel burner comprising first valve means adapted to be operably connected for on-off control of the flow of fuel to the burner, pilot means adapted to be disposed adjacent to the burner for igniting gas flowing from the burner, thermostatic valve means controlling the flow of fuel to said pilot means and said first valve means in response to the temperature of the space being heated by the burner, means responsive to the size of the flame burning at said pilot means for moving said first valve means between on and off positions, temperature setting means operably connected to said thermostatic valve means, bypass means extending around said thermostatic valve means for supplying fuel to said pilot means and said first valve means when said thermostatic valve means is closed, whereby said by-pass means supplies a sufficient quantity of fuel to said burner to support combustion at said burner so that no unignited fuel passes out of said burner during the time said thermostatic valve means is closed and said first valve means is remaining open because of thermal lag in closing of said first valve means and orifice means operably disposed downstream of said first valve means to inject fuel into the burner and being operable at low temperature settings for varying the backpressure to cycle the flame burning at the pilot between high and low rates to cause said first valve means to open and close and produce an average heat input less than that produced by a continuously burning bypass flame.

7. In a control system for a fuel burner, the combination comprising a controller pilot, normally closed automatic valve means, thermally responsive means disposed away from said burner and adjacent said controller pilot so as to be only operable when heated by a flame burning at said controller pilot to maintain said automatic valve means open to permit fuel to flow to the burner and operable when no flame is at said controller pilot to allow said automatic valve means to close, thermostatic valve means for controlling the flow of fuel to said controller pilot and said automatic valve means in response to the temperature of the space being heated by the burner, and a bypass extending around said thermostatic valve means for allowing fuel to flow only to the burner when said thermostatic valve means is closed and said automatic valve means is in an on position thereof whereby said bypass means supplies a sufficient quantity of fuel to said burner to support combustion at said burner so that no unignited fuel passes out of said burner during the time said thermostatic valve means is closed and said automatic valve means is remaining open because of thermal lag in closing of said automatic valve means.

8. In a control system for a fuel burner, the combination comprising a controller pilot, automatic valve means having sensing means disposed away from said burner and adjacent said controller pilot so as to be responsive only to a flame burning at said controller pilot for controlling the on-off flow to the burner, thermostatic valve means for throttling the flow of fuel to the controller pilot and automatic valve means in response to the temperature of the space being heated by the burner and comprising an outer annular valve seat through which fuel may flow to said automatic valve and at least one annular inner valve seat through which fuel may flow to said controller pilot, said inner valve seat being disposed inside said outer valve seat, and a by-pass extending around said thermostatic valve means for allowing fuel to flow only to the burner when said thermostatic valve means is closed and said automatic valve means is in an on position thereof whereby said by-pass means supplies a sufficient quantity of fuel to said burner to support combustion at said burner so that no unignited fuel passes out of said burner during the time said thermostatic valve means is closed and said automatic valve means is remaining open because of thermal lag in closing of said automatic valve means.

9. In a control system for a fuel burner, the combination comprising a controller pilot, a standby pilot operably disposed for igniting fuel flowing from said controller pilot and from the burner, automatic valve means having sensing means disposed away from said burner and adjacent said controller pilot so as to be only responsive to a flame at said controller pilot for controlling the flow of fuel to the burner, and thermostatic valve means including a valve seat member formed with an annular outer valve seat and a plurality of annular inner seats angularly spaced from one another and radially spaced from the axis of said outer valve seat, said inner seats being disposed inside said outer valve seat, a valve member movable relative to said valve seats for thermostatically throttling the flow of fuel to said controller pilot and said automatic valve means in response to the temperature of the space being heated by the burner, and a by-pass extending around said thermostatic valve means for allowing fuel to flow only to the burner when said thermostatic valve means is closed and said automatic valve means is in an on position whereby said by-pass means supplies a sufficient quantity of fuel to said burner to support combustion at said burner so that no unignited fuel passes out of said burner during the time said thermostatic valve means is closed and said automatic valve means is remaining open because of thermal lag in closing of said automatic valve means.

10. In a control system for a fuel burner, a controller pilot, a continuously burning standby pilot for igniting fuel flowing from said controller pilot and from the burner, automatic valve means having sensing means disposed away from said burner and adjacent said controller pilot so as to be only responsive to the temperature of the flame at said controller pilot for controlling the on-off flow of fuel to the burner, thermostatic valve means for controlling the flow of fuel to the burner and said controller pilot and including a valve member and a valve seat member formed with at least two valve seats thereon, one of said valve seats being operable to control the flow of fuel to the controller pilot and the other of said valve seats being operable to control the flow of fuel to the burner, and a by-pass extending around said thermostatic valve means for allowing the fuel to flow only to the burner when said thermostatic valve means is closed and said automatic valve means is in an on position thereof whereby said by-pass means supplies a sufficient quantity of fuel to said burner to support combustion at said burner so that no unignited fuel passes out of said burner during the time said thermostatic valve means is closed and said automatic valve means is remaining open because of thermal lag in closing of said automatic valve means.

11. In a control system for a fuel burner, the combination comprising: pilot means, first valve means movable between an open and a closed position, second valve means including an adjustable valve seat member provided with a pair of coplanar valve seats, a single valve member movable relative to said valve seat member and being cooperable with one of said valve seats for controlling flow to the burner and being cooperable with the other of said valve seats for controlling flow to said pilot means, a bypass extending around said valve seat member for supplying fuel to said first valve means when said second valve means is closed, temperature setting means operatively connected to move said valve seat member to a set point corresponding to the temperature to be maintained in the space being heated by the burner, and temperature responsive means disposed away from said burner and adjacent said pilot means so as to be operatively connected to move said first valve means from said closed position to said open position only upon ignition of gas flowing from said pilot means, said temperature responsive means being further operable to allow said first valve means to move to said closed position when the flame at said pilot means is extinguished whereby said by-pass supplies a sufficient quantity of fuel to said burner to support combustion at said burner so that no unignited fuel passes out of said burner during the time said single valve member is closed and said first valve means is remaining open because of thermal lag in closing of said first valve means.

12. The device of claim 11 in which additional temperature responsive means are provided for moving said valve member relative to said valve seat member to thermostatically control the flow of fuel to said pilot means and to the burner in response to the temperature of a space being heated by the burner.

13. The device of claim 12 wherein at low temperature settings said second mentioned temperature responsive means is operable to move said valve member into engagement with said valve seats to shut off the flow to the burner and to said pilot means to cause said first valve means to close.

14. The device of claim 12 in which said first valve means is opened and closed when said valve seat member is at a low temperature set point to produce an average heat input to the burner less than that obtained with a minimum continuously burning flame at the burner.

15. Control apparatus for a domestic oven burner comprising a standby pilot having a continuously burning flame; a controller pilot disposed adjacent to said standby pilot and being adapted to be lit by the flame burning at said standby pilot for igniting fuel flowing from the oven burner; automatic valve means having sensing means disposed away from said burner and adjacent said controller pilot so as to be movable between open and closed positions only in response to ignition and extinguishment of the flame at said controller pilot for controlling the flow of fuel to the burner, and an oven control valve comprising a casing formed with an interiorly threaded section having an annular groove, an exteriorly threaded valve seat member screwed into said section and having a central flow passage, an outer annular valve seat, at least a pair of inner annular valve seats and passage means extending from said inner annular valve seats into communication with said groove, said inner valve seats being disposed inside said outer valve seat, a disc valve member movable relative to said valve seat member for controlling a flow of fluid through said casing, said valve member being cooperable with said outer valve seat for controlling the flow of fuel to the burner, said valve member being further cooperable with said inner valve seats for controlling a flow of fuel to said groove, said groove being in communication with said controller pilot, means responsive to the temperature of the oven for moving said valve member, a bypass extending around said valve seat member for providing a minimum flow of fuel to the burner when said valve member is closed against said valve seats, whereby said by-pass supplies a sufficient quantity of fuel to said burner to support combustion at said burner so that no unignited fuel passes out of said burner during the time said valve member is closed and said automatic valve means is remaining open because of thermal lag in closing of said automatic valve means and temperature setting means operatively connected to move said valve seat member to a position corresponding to the temperature to be maintained in the oven.

16. The device of claim 15 wherein said temperature responsive means is operable, when said valve seat member is at a low temperature set point, to move said valve member into engagement with said valve seat member to shut off the flow of fuel to said controller pilot to cause said automatic valve means to close whereupon subsequent decreases in temperature within the oven cause said valve member to move away from said valve seat member and allow fuel to flow to said controller pilot where it is ignited to cause said automatic valve means to open to maintain the desired temperature.

17. In a control system for fuel burning apparatus, the combination comprising main and pilot burners, ignition means for said burners, first valve means operable for controlling a flow of fuel to said main burner, thermostatically operated valve means controlling a flow of fuel to said pilot burner and said first valve means, means disposed away from said main burner and adjacent said pilot burner so as to be responsive only to a flame at said pilot burner to cycle said first valve means between on and off positions when said thermostatically operated valve means cycles the flow of fuel to said pilot burner, and means bypassing said thermostatically operated valve means to supply a bypass flow of fuel to said main burner when said first valve means is in an on position whereby said by-pass means supplies a sufficient quantity of fuel to said main burner to support combustion at said main burner so that no unignited fuel passes out of said main burner during the time said thermostatically operated valve means is closed and said first valve means is remaining open because of thermal lag in closing of said first valve means.

(References on following page)

References Cited in the file of this patent

UNITED STATES PATENTS

| | | |
|---|---|---|
| 455,382 | Bell et al. | July 7, 1891 |
| 1,704,807 | O'Neal | Mar. 12, 1929 |
| 1,842,335 | TePas | Jan. 19, 1932 |
| 2,004,597 | Birtch | June 11, 1935 |
| 2,329,682 | Alfery | Sept. 14, 1943 |
| 2,505,455 | Andersson | Apr. 25, 1950 |
| 2,794,600 | Ehlke | June 4, 1957 |
| 2,807,423 | Eskin | Sept. 24, 1957 |
| 2,919,858 | Matthews | Jan. 5, 1960 |
| 2,924,387 | Hajny | Feb. 9, 1960 |

FOREIGN PATENTS

| | | |
|---|---|---|
| 803,132 | France | June 29, 1936 |